March 17, 1936.                H. C. EDDY                2,034,285
           METHOD AND APPARATUS FOR BREAKING EMULSIONS
                      Filed April 2, 1932
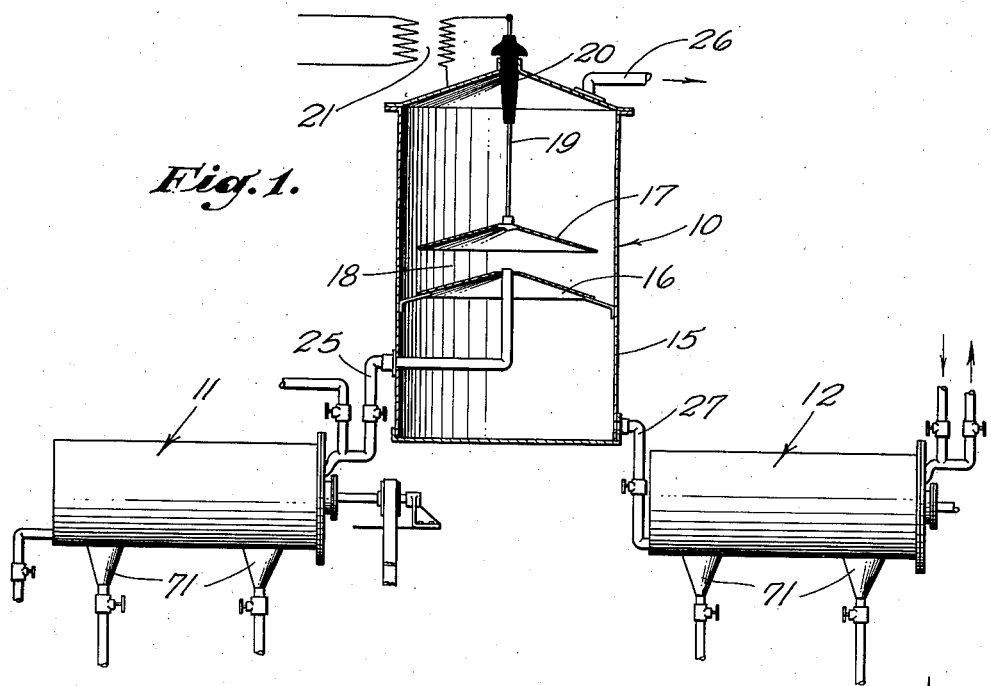
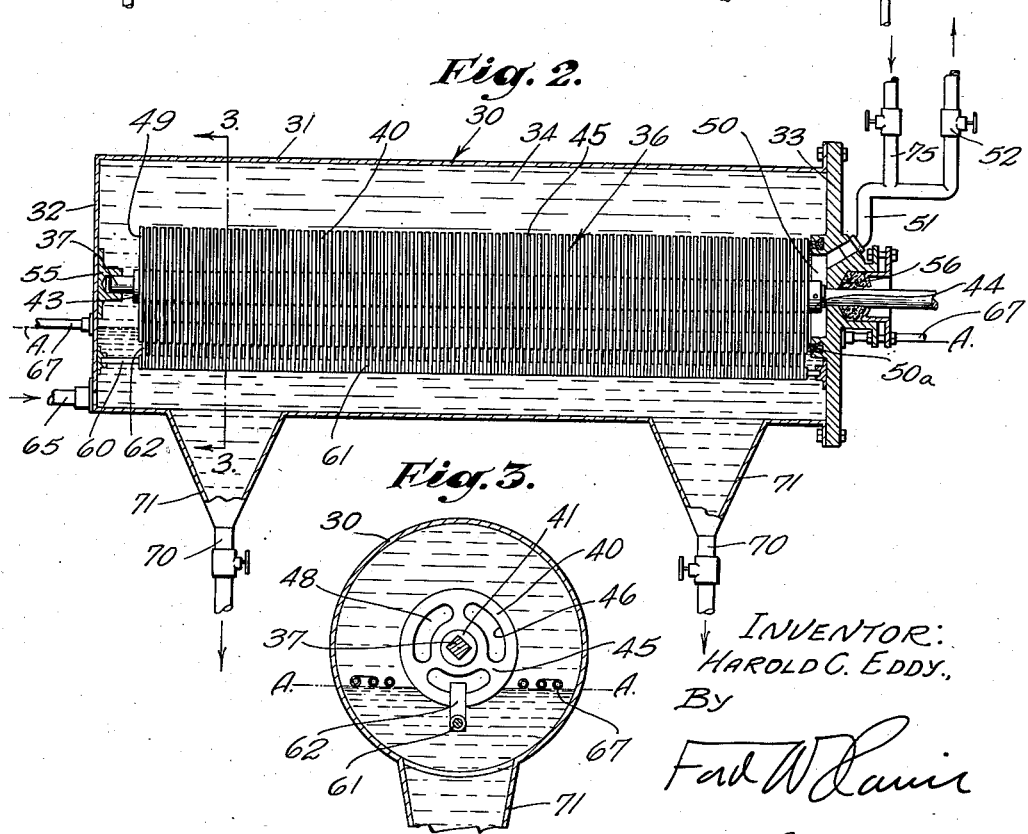
INVENTOR:
HAROLD C. EDDY,
By
              ATTORNEY.

Patented Mar. 17, 1936

2,034,285

UNITED STATES PATENT OFFICE 2,034,285

METHOD AND APPARATUS FOR BREAKING EMULSIONS

Harold C. Eddy, Los Angeles, Calif., assignor to Petroleum Rectifying Company of California, Los Angeles, Calif., a corporation of California Application April 2, 1932, Serial No. 602,767

8 Claims. (Cl. 210—47)

My invention realtes to a method and apparatus for breaking emulsions and in its preferred embodiment is utilized in conjunction with an electrical system for treating such emulsions.

It is well known that a high-potential electric field of alternating polarity has a tendency to agglomerate the dispersed particles of a petroleum emulsion. With certain of these emulsions there is loosely associated an amount of excess water which retards the rate of treatment in the electric field, and which often causes operating difficulties, such as excessive current flow, etc.

It is an object of this invention to provide a method and apparatus for subjecting the emulsion to a preliminary treatment in which mechanical means is utilized to separate any loosely bound water particles, this treatment being preliminary to treatment in an electric field.

Other objects of the invention lie in the novel type of preliminary treater per se, as well as in the method of treatment which may be effected by such a device.

The through-put of an electric dehydrator is dependent upon the rate of settling which can be effected. My experiments indicate that subsequent to electric treatment a portion of the dry oil separates relatively fast. However, a certain amount of oil is carried down with the agglomerated water particles and tends to form a loose emulsion. In the conventional electric dehydrator this loose emulsion exists in the form of a stratified body between the body of oil in the upper part of the settling space and the body of water in the lower part of the settling space. The rate of settling is very much retarded by the presence of such a body of loose emulsion which separates into its constituent phases only at a slow rate. In the present dehydrating method it is possible to remove this loose emulsion from the treater tank prior to the time that it separates into its constituent, parts in the treater, this loose emulsion being subjected to an auxiliary treatment, usually a mechanical one, which greatly increases the rate of separation of the constituents of this loose emulsion.

It is an object of this invention to provide such an auxiliary treating action.

A further object of the invention is to utilize both a preliminary and an auxiliary treating action in conjunction with the electric dehydration of emulsion.

The preliminary and auxiliary treaters may conveniently be of identical construction. In their preferred embodiment they include a plurality of minute passages through which the emulsion tends to move.

It is an object of the invention to provide an improved form of treating apparatus including a plurality of minute passages which are too small to pass the larger dispersed particles of an emulsion. This action is thus in a sense a filtration one, and certain of the objects of this invention are to provide a novel filter in which portions of the minute passages extend below a body of washing medium.

A further object of the invention is to apply heat to the interior of such a treater at or near the surface of the washing medium.

Further objects of the invention lie in other details of construction of the apparatus to be hereinafter described, while still further objects of the invention will be apparent to those skilled in the art from the following detailed description of one embodiment of the invention.

Referring to the drawing,—

Fig. 1 is a diagrammatic view illustrating an electric dehydrator provided with preliminary and auxiliary treaters.

Fig. 2 is a sectional view of one of these treaters.

Fig. 3 is a sectional view taken on the line 3—3 of Fig. 2.

Referring particularly to Fig. 1, I have illustrated a conventional electric dehydrator 10 in conjunction with a preliminary treater 11 and an auxiliary treater 12.

The dehydrator 10 may conveniently comprise a tank 15 closed at its upper end and in which a grounded electrode 16 is positioned. A live electrode 17 is supported above the electrode 16 and cooperates therewith in defining a treating space 18. These electrodes may be of any convenient form, but have been illustrated as comprising conical electrodes the upper of which is supported upon a rod 19 extending through an insulator 20. A high potential is impressed between the electrodes 16 and 17 by any convenient means such as a transformer having a secondary winding 21 connected to the live electrode 17 through the rod 19 and connected to the grounded electrode 16 through the tank 15. Energization of such a transformer sets up a high potential alternating field in the treating space 18. In certain instances direct current may also be utilized.

Emulsion is supplied to the dehydrator 10 through a pipe 25 communicating with the treating space 18. The dispersed particles of this emulsion are agglomerated in the electric field, the lighter phase (usually oil) tending to move upward in the tank 15 so as to be withdrawn through a pipe 26, and the heavier constituent dropping in the tank 15 and being withdrawn through a pipe 27.

As mentioned above, it is preferable to control the flow through the pipes 26 and 27 so that the material flowing through the latter pipe is in the form of a loose emulsion. This is in contradistinction to the usual method of operating such a dehydrator wherein the flow through the pipes 25, 26, and 27 is so controlled that complete separation will take place in the tank 15. This conventional mode of operation slows up the dehydration process, and with the new system herein shown it is possible to secure a much greater through-put by withdrawing larger quantities of liquid through the pipe 27, this liquid then being in the form of a loose emulsion which has not yet separated into its constituent parts. Such a loose emulsion would, however, upon standing, separate, but I have found that the capacity of the complete system is greatly increased by the use of the auxiliary treater 12.

It is entirely possible to utilize a preliminary treater 11, and an auxiliary treater 12 which are of identical construction, and while I am not limited to this combination, I have shown in Fig. 2 a treater which can be utilized in either capacity.

Such a treater may conveniently comprise a container 30 composed of a shell 31 permanently closed at one end by a head 32 and including a removable head 33 secured to the other end thereof. The interior of the container 30 thus provides a chamber 34. It is preferable to maintain a body of washing medium in the lower portion of the chamber 34 and a body of emulsion to be treated in the upper portion of this chamber. The washing medium is preferably in the form of a liquid of greater density than the emulsion, and usually comprises a body of water, these bodies of washing liquid and emulsion separating at a level or section indicated by the line A—A. Suitable means, not shown, may be provided for maintaining this level A—A substantially as shown in Figs. 2 and 3.

Positioned in the chamber 34 is a horizontally extending filter unit 36. This unit includes a shaft 37 including a squared portion retaining a plurality of discs 40 which are provided with square-shaped holes snugly fitting the squared portion of the shaft 37. This filter unit also includes a plurality of spacers 41, there being one spacer for each disc, these spacers being adjacent the discs. The discs and spacers are clamped into a compact unit and are retained on the shaft 37 by any suitable means such as a fixed collar 43 and a slidable collar 44 detachably secured to the shaft 37. The discs 40 are thus spaced from each other to define a plurality of vertically disposed passages 45, the outer portions of which define mouths opening on the interior of the container 30.

Each disc 40 is interstitial in character, each disc providing one or more cut-out portions bounded by walls 46, best shown in Fig. 3, these cut-out portions of adjacent discs being in alignment with each other so as to form one or more discharge passages 48. An end plate 49 is positioned adjacent the collar 43 and is imperforate so as to define one end of these discharge passages. The other end of these discharge passages communicates with a manifold passage or chamber 50 formed adjacent the head 33 and separated from chamber 30 by a packing ring 50a suitably mounted on the head 33. The outgoing liquid moves into this chamber and through a pipe 51, through a valve 52, and into the pipe 25 of the dehydrator in the event that the treater is used as indicated by the numeral 11 of Fig. 1.

It is entirely practical to retain the filter unit 36 stationary, but in the preferred embodiment I prefer to rotatably mount this unit, this being accomplished by the provision of a bearing 55 secured to the head 32 and by journalling the opposite end of the shaft in the head 33, utilizing a stuffing box 56 or other packing means for sealing this junction. A suitable drive means, not shown, is utilized for slowly turning the shaft 37. The rate of rotation is not critical, one or two revolutions per minute having been found to be adequate.

In the preferred embodiment I prefer to utilize a cleaning means mounted on a rod 60 extending between the heads 32 and 33 below and parallel to the shaft 37. Suitably spaced along this rod by washers 61 are scrapers 62 which extend upward into the mouths of the passages 45. These scrapers are of substantially the same width as the distance across the passages 45 so that as the filter unit 36 rotates these scrapers remove any foreign matter accumulating adjacent the mouths of the passages 45. In the preferred embodiment these scrapers 62 extend into the body of washing liquid, the upper ends of these scrapers terminating at or near the level A—A.

Any suitable means may be utilized for introducing the emulsion into the interior of the tank, but I have found it preferable to introduce this emulsion at a point below the level A—A so that the incoming emulsion is washed in the washing liquid. This may conveniently be accomplished by the use of an inlet pipe 65.

When treating petroleum emulsions, it is usually, though not invariably, necessary to heat the incoming emulsion. This may be accomplished exterior of the container 30, but is preferably accomplished in the chamber 34. In the preferred embodiment I provide steam coils or other heating means 67 in the chamber 34, this heating means being positioned as close as possible to the level A—A, this construction having been found to give the best results.

In the operation of the invention, the filter unit 36 is slowly rotated during the time that the incoming emulsion is forced through the pipe 65 under pressure. The liquid in the chamber 34 is thus placed under pressure and tends to move into the mouths of the passages 45 and thence through the discharge passages 48, the chamber 50, and through the pipe 51. A very desirable separation is effected as the emulsion moves into the passages 45, for the larger water particles appear to resist any tendency to move into these passages. The result is that these larger particles are separated at the edges of the discs 40 and either immediately drop downward into the body of washing liquid or remain adjacent the outer edges of these discs until such time as the rotation of the filter unit brings them below the level A—A at which time they unite with the washing liquid.

In addition the incoming emulsion often carries solid foreign matter the particle-size of which is too large to enter the passages 45. The result is that this foreign matter is deposited adjacent the edges of the discs 40 and is removed by the scrapers 62 in the presence of the washing liquid. This foreign matter thus drops directly to the bottom of the container 30. Both the water and the foreign matter may be removed from this container through one or more pipes 70 communicating with funnels 71.

It is often desirable to intermittently flush the passages 45 by means of a washing liquid. This may be easily accomplished by connecting the inlet pipe 65 to discharge, closing the valve 52, and forcing the washing liquid into the pipe 51 through a pipe 75. The flow through the passages 45 is thus reversed and these passages can thus be flushed to remove any foreign matter on the walls thereof or on the walls of the discharge passages 48.

The material moving inward through the passages 45 of the preliminary treater 11 is in the form of a tight emulsion of oil and water. This emulsion can be very efficiently broken by the use of the dehydrator 10 in a manner previously described. If this dehydrator is operated in such a manner that the material flowing through the pipe 27 is in the form of a loose emulsion, it is desirable to utilize the auxiliary treater 12 for effecting a rapid separation. Such a treater may be of the same design as shown in Fig. 2, the loose emulsion passing from the pipe 27 into the inlet pipe 65, the water being withdrawn from the lower portion of the container and the dry oil being withdrawn through the pipe 51 and conducted to storage. Such a loose emulsion is easily broken by a treater of the type shown in Fig. 2, the large water masses readily separating from the oil and dropping in the container 30. It is optional whether or not a washing liquid is used in the treater 12, but if used it is usually desirable to maintain the level of the separated water at such a height that the lower portions of the discs dip thereinto. This is, however, not essential to the successful separation of a loose emulsion.

It should be understood that the passages 45 may be formed by means other than the discs 40 shown, any means forming such annular passages being within the scope of the invention. The distance across these annular passages is not critical and may range from a few thousandths of an inch to one-fourth of an inch or more depending upon the character of the incoming emulsion and the size of the particles to be removed therefrom. So also, it is not necessary to have the distance across the passages 45 of the treaters 11 and 12 equal, for in many instances it is preferable to utilize a different spacing in the two treaters. Usually the spacing between the discs 40 may be larger in the treater 12 than in the treater 11.

With certain loose emulsions it is entirely possible to effect a complete separation by passing this emulsion through such a treater as shown in Fig. 2. Usually, however, it is desirable to split up the process into two or three steps, as pointed out above.

The use of the preliminary and auxiliary treaters 11 and 12 in conjunction with an electric dehydrator not only effects a much more rapid rate of treatment than is possible by the use of the electric dehydrator itself, but in addition the preliminary treater 11 removes from the incoming emulsion substances which are undesirable in the electric field. The treating action by the use of the preliminary treater 11 is thus superior to that effected by the use of the dehydrator 10 alone.

I claim as my invention:
1. In an apparatus for treating an emulsion, the combination of: a container partially filled with a washing liquid; walls defining a plurality of minute vertically disposed annular passages the outer portions of which provide mouths opening on the interior of said container, said walls extending partially below said washing liquid and partially thereabove, whereby the lower portions of said mouths open on said washing liquid and the upper portions of said mouths open on the space above said washing liquid; walls defining a discharge passage communicating with the inner portions of said annular passages; means for forcing the emulsion to be treated into said mouths, the minute annular passages separating the larger particles of said emulsion which move into and remain in said washing liquid in the bottom of said container the remaining liquid moving into said discharge passage; and means for withdrawing liquid from the bottom of said container.

2. A combination as defined in claim 1 in which said means for forcing emulsion into said mouths includes means for introducing said emulsion into said container beneath the surface of said washing liquid.

3. In an apparatus for treating an emulsion, the combination of: a container retaining a body of washing liquid in one portion thereof and retaining a body of emulsion adjacent said body of washing liquid; a filter unit comprising walls forming a plurality of annular passages the outer portions of which provide mouths, and including a discharge passage extending through said filter unit and communicating with the inner portions of said annular passages; means for rotatably mounting said filter unit in said container in a position to extend partially in and partially spaced from said washing liquid whereby successive portions of each mouth move into and from said washing liquid as said filter unit is rotated; means for rotating said filter unit; and means for forcing said emulsion into those portions of said mouths spaced from said washing liquid whereby the larger particles of the dispersed phase of said emulsion are separated and move into and remain in said washing liquid.

4. In an apparatus for treating an emulsion, the combination of: a container retaining a body of washing liquid in one portion thereof and retaining a body of emulsion adjacent said body of washing liquid; a filter unit comprising walls forming a plurality of annular passages the outer portions of which provide mouths, and including a discharge passage extending through said filter unit and communicating with the inner portions of said annular passages; means for rotatably mounting said filter unit in said container in a position to extend partially in and partially spaced from said washing liquid whereby successive portions of each mouth move into and from said washing liquid as said filter unit is rotated; means for rotating said filter unit; means for forcing said emulsion into those portions of said mouths spaced from said washing liquid whereby the larger particles of the dispersed phase of said emulsion are separated and move into and remain in said washing liquid; and means beneath the surface of said washing liquid and extending into the mouths of said annular passages to remove any foreign matter separated on said walls.

5. A combination as defined in claim 3 including means for introducing the emulsion to be treated into said container at a section beneath said surface of said washing medium.

6. A combination as defined in claim 3 including a heating means disposed adjacent the surface of said washing liquid and positioned in spaced relationship with said filter unit.

7. In an apparatus for treating an emulsion, the combination of: a container retaining a body of washing liquid in one portion thereof and a body of emulsion adjacent said body of washing liquid; a horizontal shaft; a plurality of discs mounted on said shaft each disc providing cut-out portions, the cut-out portions of adjacent discs being in alignment to provide a discharge passage; spacer means on said shaft for spacing said discs from each other to define a plurality of annular passages the inner portions of which communicate with said discharge passage and the outer portions of which provide mouths opening on the interior of said container, the diameter of said discs being such that portions of each disc extend below the surface of said body of washing liquid; means for rotating said shaft; a plurality of stationary scrapers extending in said body of washing liquid and into said mouths whereby any sediment collected adjacent said mouths is removed; means for forcing said emulsion into said mouths while said shaft is rotating whereby a separation takes place, the material passing through said mouths reaching said discharge passage and the material collected adjacent said mouths joining said body of washing liquid.

8. A method of separating the phases of an emulsion containing a continuous phase and a dispersed aqueous phase, which method includes selectively filtering from said emulsion the larger dispersed aqueous particles by forcing said emulsion through small vertical passages only partially submerged in a body of aqueous liquid whereby the said larger aqueous particles become associated with said body of aqueous liquid and are thus removed from said emulsion, the smaller aqueous particles of said emulsion moving through said passages substantially in their original size.

HAROLD C. EDDY.